United States Patent
Straetmans

(10) Patent No.: US 12,410,094 B2
(45) Date of Patent: Sep. 9, 2025

(54) METHOD FOR DRYING SLAB-SHAPED MATERIALS AND DRYING DEVICE

(71) Applicant: GRENZEBACH BSH GMBH, Bad Hersfeld (DE)

(72) Inventor: Christoph Straetmans, Wippershain (DE)

(73) Assignee: GRENZEBACH BSH GMBH, Bad Hersfeld (DE)

( * ) Notice: Subject to any disclaimer, the term of this patent is extended or adjusted under 35 U.S.C. 154(b) by 936 days.

(21) Appl. No.: 17/594,219

(22) PCT Filed: Apr. 5, 2020

(86) PCT No.: PCT/EP2020/000080
§ 371 (c)(1),
(2) Date: Oct. 7, 2021

(87) PCT Pub. No.: WO2020/207617
PCT Pub. Date: Oct. 15, 2020

(65) Prior Publication Data
US 2022/0177367 A1    Jun. 9, 2022

(30) Foreign Application Priority Data

Apr. 11, 2019   (DE) .......................... 102019002671.3

(51) Int. Cl.
| | |
|---|---|
| C04B 11/036 | (2006.01) |
| C04B 40/00 | (2006.01) |
| F26B 3/04 | (2006.01) |
| F26B 15/12 | (2006.01) |

(52) U.S. Cl.
CPC ........ *C04B 11/036* (2013.01); *C04B 40/0082* (2013.01); *F26B 3/04* (2013.01); *F26B 15/12* (2013.01); *F26B 2210/02* (2013.01)

(58) Field of Classification Search
CPC ..... C04B 11/036; C04B 40/0082; F26B 3/04; F26B 15/12
See application file for complete search history.

(56) References Cited

U.S. PATENT DOCUMENTS

| | | | |
|---|---|---|---|
| 3,529,357 A | 9/1970 | Schutte et al. | |
| 4,312,136 A | 1/1982 | Bahner et al. | |
| 4,890,394 A | 1/1990 | Troetscher | |
| 5,603,168 A | 2/1997 | McMahon, Jr. | |
| 5,659,975 A | 8/1997 | Bahner et al. | |
| 9,488,411 B2 * | 11/2016 | Straetmans | F26B 21/04 |
| 2003/0217799 A1 | 11/2003 | Falinower et al. | |
| 2004/0248056 A1 | 12/2004 | Straetmans et al. | |
| 2012/0246966 A1 * | 10/2012 | Straetmans | F26B 13/10 34/451 |
| 2015/0094839 A1 | 4/2015 | Dellangelo et al. | |
| 2015/0308739 A1 | 10/2015 | Mongrolle et al. | |

FOREIGN PATENT DOCUMENTS

| | | |
|---|---|---|
| DE | 1946696 A | 4/1970 |
| DE | 2613512 A | 10/1977 |
| DE | 3030272 C2 | 9/1982 |
| DE | 4326877 C1 | 10/1994 |
| DE | 10146179 C1 | 10/2002 |
| DE | 102009059822 B4 | 6/2011 |
| WO | 9617214 A1 | 6/1996 |

* cited by examiner

*Primary Examiner* — Yong L Chu
(74) *Attorney, Agent, or Firm* — Abel Schillinger, LLP

(57) ABSTRACT

A method for drying building material slabs, in particular slabs containing gypsum, which are guided in floors (15) through an device divided into a drying pre-zone (2) and drying chambers and in which the slabs are brought into contact with drying air, characterized in that drying air is applied from the drying pre-zone (2) to the slabs in an area (1) arranged upstream of the pre-zone (2) and enclosed at least, with respect to the conveying direction of the boards, on both longitudinal sides and on the upper side.

17 Claims, 3 Drawing Sheets

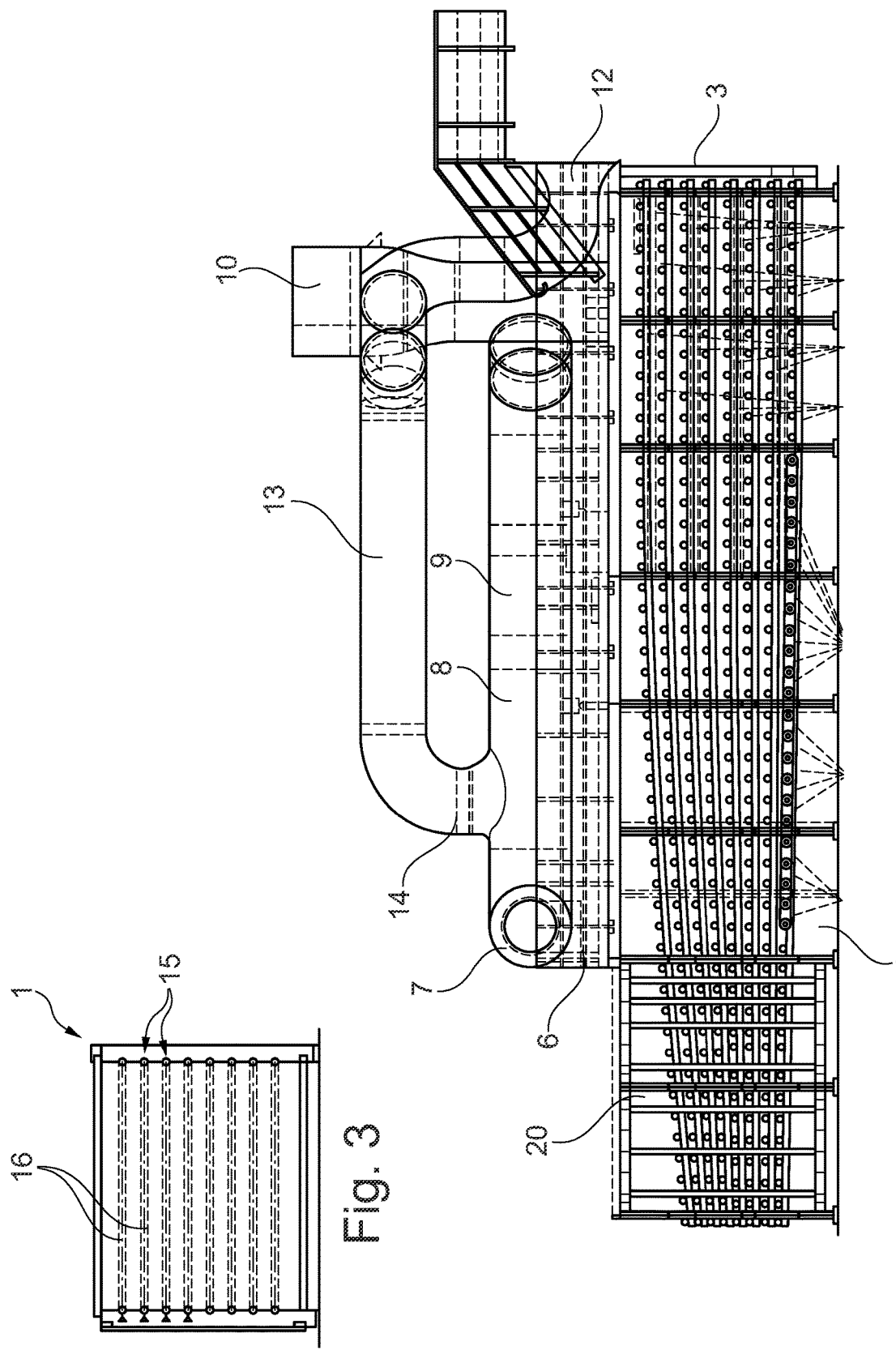

METHOD FOR DRYING SLAB-SHAPED MATERIALS AND DRYING DEVICE

BACKGROUND OF THE INVENTION

Field of the Invention

The invention relates to a method and a device for drying slabs or slab-like materials, in particular gypsum containing slabs.

Discussion of Background Information

The drying of such board-shaped materials is in most cases carried out by a predominantly convective heat transfer in the form of the overflow of heated air. In this process, the slabs are fed through the dryer, often distributed over several floors, with the aid of conveying equipment such as roller conveyors or screen belts.

According to the state of the art, dryers are usually operated in recirculation mode. The drying air is fed to the boards several times and reheated after each contact. In this way, the air is increasingly enriched with moisture, and only a small part of the drying air is discharged into the environment as exhaust air in order to remove moisture and flue gases.

A distinguishing feature of various dryer designs is the way in which the air is directed over the material to be dried. The air can essentially be guided to the slab in the form of cross ventilation, longitudinal ventilation, or so-called impingement jet ventilation.

In the case of transverse aeration, the drying air is guided over the material to be dried from the side, transversely to the direction of conveyance of the board-shaped material. Since the drying air cools increasingly as it passes over the material to be dried, this results in different drying speeds across the width.

For this reason, this process is not used for sensitive materials such as gypsum containing slabs. With longitudinal ventilation, the drying air travels along the longitudinal axis of the dryer over a long distance, flowing over the board, drying it and thus cooling it considerably.

In impingement ventilation, the drying air is fed in from the side of the dryer in air ducts known as nozzle boxes and blown vertically onto the surface of the material to be dried via air outlet nozzles. From there, this air flows to the opposite side of the drying system.

One of the advantages of this type of dryer is that the desired drying temperature and climate can be freely selected over the length of the dryer thanks to the structure consisting of many, relatively short drying chambers, each of which can be individually ventilated and heated. Thus, the drying conditions can be adapted to the needs of the goods to be dried. The dryer also offers excellent controllability, e.g. for product changes. Due to the good heat transfer during impingement flow, such dryers can be built significantly shorter than comparable dryers with longitudinal air flow. Such a system is described in DE 19 46 696 A1 under the heading of a process and a device for accelerated drying of gypsum boards. However, no information is given on particularly favorable operation in terms of energy.

In principle, the energetic efficiency of all these forms of ventilation can be improved by heating fresh air with the aid of a heat exchanger. The fresh air heated in this way is then used as combustion air or is used for pre-drying.

DE 26 13 512 A1 discloses a two-stage drying process and a drying system. According to DE 26 13 512 A1, the task is to modify or supplement the known two-stage drying process in such a way that in particular gypsum boards or goods with similar properties can be dried particularly economically in terms of energy using this zo process. A characteristic feature is that the heat exchanger is used to heat the circulating air of a downstream, impact-jet ventilated drying zone.

DE 10 2009 059 822 B4 describes a process for drying slabs which are guided in levels through a device divided into drying chambers, the boards being brought into contact with the drying air in a drying device by means of impingement jet ventilation, and the impingement jet ventilation being provided by means of transversely ventilated nozzle boxes. Here, the drying device is a main drying stage or a final drying stage in a drying plant.

This procedure is based on the fact that the drying exhaust air should be cooled as much as possible before entering the heat exchanger. This further improves the energy efficiency. Mention is also made in this connection of the use of the preheated fresh air for pre-drying the boards in upstream, cross-ventilated pre-zone slabs.

It is the object of the present invention to create a drying process that is even more efficient than conventional processes. To this end, the pre-zone exhaust air is to be used to preheat the boards in the dryer inlet area. The energy transferred in this way would then no longer have to be supplied via the burners in the subsequent process, resulting in a thermal advantage.

According to the invention, this object is resolved as disclosed by claim 1.

Contrary to the otherwise usual procedure, according to the invention, gypsum-containing, board-shaped materials, such as gypsum plasterboards, but also gypsum fiberboards, are already exposed to warm air from the drying pre-zone of the dryer during the curing phase (hydration). The curing phase usually lasts eight to twelve minutes and includes an area in front of the dryer in which the boards have already been divided into the individual floors.

The invention is based on the surprising realization that, contrary to expectations, boards which have not yet been fully cured, i.e. are still in the final phase of the curing process, can be exposed to moderately warm drying air without this in any way impeding full hydration.

Advantageous further embodiments are apparent from the dependent claims and the description, particularly in conjunction with the drawings.

In an advantageous manner, the process is characterized in that exhaust air from the drying pre-zone flows as drying air along the boards in an enclosed area against the conveying direction of the boards and is cooled in the process.

It is further provided that the cooled air is extracted and released into the environment.

In order to control the air flow, i.e., the supply of drying air into the enclosed area, temperature and/or humidity sensors are preferably provided.

According to the invention, a slight negative pressure of 50 Pa or less, in particular of 20 Pa or less, is generated in the enclosed area by means of the fan. Preferably, the moisture content of the air in the enclosed area is controlled to a value of less than 30 g, preferably 20 g or less, per kilogram of air. Preferably, an air temperature of 35 to 60° C. is maintained in the enclosed area. The climate created in this way has the effect that, particularly where the slabs enter the enclosed area, an undershoot of the dew point can be effectively avoided. Such an undershooting of the dew point could, for example, lead to the punctual dripping of water droplets onto the surfaces of the slabs and cause undesirable discoloration there.

SUMMARY OF THE INVENTION

According to the invention, a device is also provided for multi-floor dryers for drying boards containing gypsum. Such a device is characterized in that the drying pre-zone is preceded by an enclosed area in which drying air from the drying pre-zone is applied to the boards.

Preferably, the enclosed area comprises side walls and a top cover as well as inlet-side covers between the floors receiving the boards; it is open towards the drying pre-zone for the drying air to flow in. The walls and covers can also be provided with doors or viewing windows.

In addition, it is advantageous to use a fan in the area of the piping, through which drying air is extracted from the enclosed area after it has absorbed moisture from the slabs there and warmed them up a little.

It is also advantageous to use a pipeline to exhaust the drying air saturated with moisture through a pipeline connected to a chimney.

If the device also comprises a control or regulating device by means of which the supply of drying air to the enclosed area can be controlled by means of temperature and/or humidity sensors, the mode of operation of the enclosed area upstream of the pre-zone is optimized.

In addition, a bypass line is preferably provided to remove excess drying air from the pre-zone that is not required in the enclosed area. In this way, the excess drying air can be discharged together with the air from the enclosed area when the bypass line is connected to the stack.

BRIEF DESCRIPTION OF THE DRAWINGS

The invention is explained in more detail below with reference to the drawings. They show.

DETAILED DESCRIPTION OF EMBODIMENTS OF THE INVENTION

Figure 1:
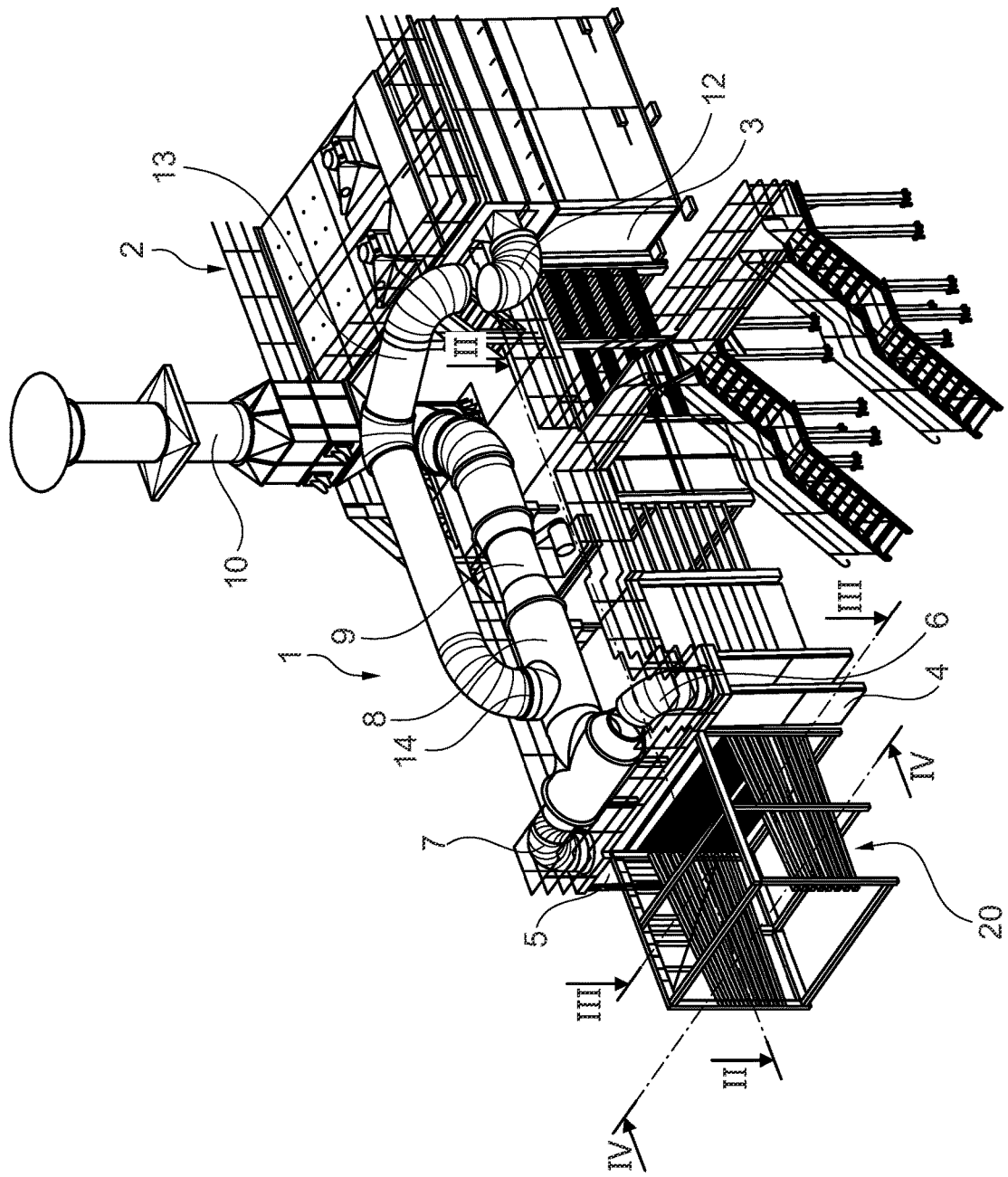
FIG. 1 an isometric view of an enclosed area in front of a prezone of a drying device for drying a board-shaped material, segment boards forming the outer wall being omitted, FIG. 2 a vertical sectional view of the enclosed area in longitudinal direction along a sectional line II-II of FIG. 1, FIG. 3 a vertical sectional view of the enclosed area along a sectional line III-III from FIG. 1, and FIG. 4 a horizontal sectional view of the enclosed area along a sectional line IV-IV from FIG. 1.
Figure 4:
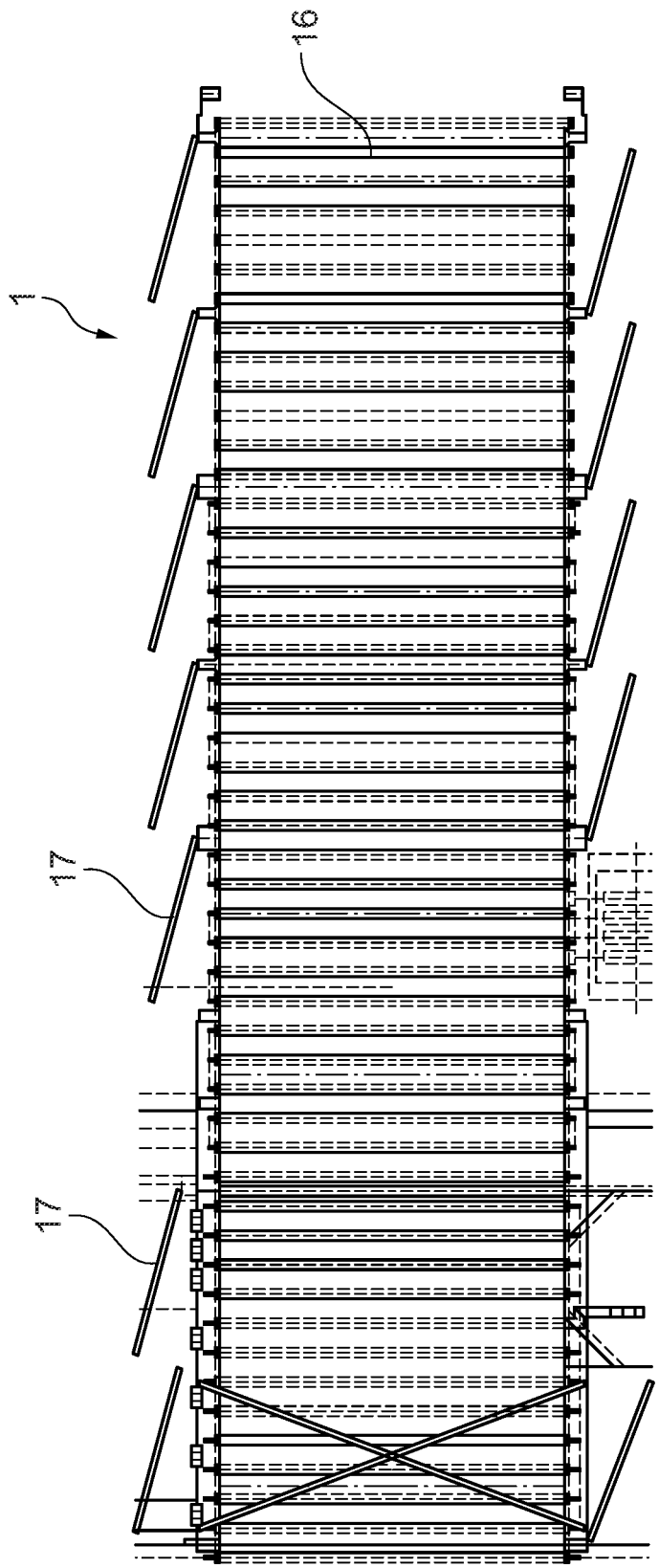

An enclosed area 1 (FIGS. 1 to 4) extends between a charging zone 20 or feeding device and a pre-zone 2 of a drying device. In the area, the setting or curing process in the boards, in particular the gypsum boards, is completed. The pre-zone 2 is connected to the area 1 without transition and extends to a front wall 3 of the pre-zone 2, so that drying air flows from the pre-zone 2 into the area 1 and heats the boards to a temperature of up to 60° C. At the same time, a negative pressure and a humidity of less than 30 g of water per kilogram of air are maintained in area 1, so that the drying air absorbs moisture from the slabs and the setting process in them is supported.

In the ceiling area, the drying air is supplied through two protrusions 4, 5, each located laterally above and on either side of area 1. From the porches 4, 5, moisture-enriched air flows via intake pipes 6, 7 to a central exhaust pipe 8, which runs above area 1, comprises a fan 9 and passes into a chimney 10, which in turn is equipped with a filter system 11.

On the front wall 3 of the prezone 2, on one or both sides of the wall 3, there is an exhaust port 12 from which a bypass line 13 leads to a flange 14 through which the bypass line 13 is connected to the exhaust pipe 8, so that drying air is exhausted from the prezone 2, if necessary.

Inside, the zone 1 has floors 15 (FIG. 3) with rollers 16. The wall is formed by a plurality of segmental boards 17 (FIG. 4), which are preferably hinged to allow easy access to the interior of area 1 for inspection work and checks.

In the direction of the feed area for feeding the boards, sheet metal strips (not shown) are attached to the feed opening between the floors 15, which open only when the boards are fed through on the floors 15 to such an extent that the introduction of the boards is made possible, but the area 1 otherwise remains closed. Sealing elements are also provided on both sides of the boards at the feed opening.

What is claimed is:

1. A device for drying building material slabs with drying air, wherein the device comprises floors and is divided into (1) a preliminary drying zone, (2) drying chambers, and (3) an enclosed area which precedes the preliminary drying zone and in which drying air from the preliminary drying zone is applied to the slabs which are in a final phase of a curing process to complete the curing process of the slabs in the enclosed area, and wherein in the enclosed area (i) a negative pressure of 50 Pa or less is generated, (ii) a moisture content of the drying air is controlled to a value of less than 30 g per kilogram of air and (iii) a temperature of the drying air is maintained at a value of from 35° C. to 60° C.

2. The device of claim 1, wherein the enclosed area has side walls and a top cover as well as inlet-side covers between shelves for receiving the slabs and is open towards the preliminary drying zone for an inlet of the drying air.

3. The device of claim 1, wherein the drying air can be withdrawn from the enclosed area by a fan which is introduced in a pipe.

4. The device of claim 3, wherein the pipe is connected to a chimney.

5. The device of claim 1, wherein the device further comprises a control or regulating device by which a supply of drying air to the enclosed area can be controlled or regulated by means of temperature and/or humidity sensors.

6. The device of claim 1, wherein the device further comprises a bypass line for discharging excess drying air from the preliminary drying zone.

7. The device of claim 6, wherein the bypass line is connected to a chimney which is connected to a pipe, the pipe having introduced therein a fan by which drying air can be withdrawn from the enclosed area.

8. The device of claim 1, wherein the negative pressure of (i) is 25 Pa or less.

9. The device of claim 1, wherein the moisture content of (ii) is 20 g or less per kilogram of air.

10. A method for drying building material slabs, wherein the method comprises guiding the slabs in floors through the device of claim 1.

11. The method of claim 10, wherein the slabs comprise gypsum.

12. The method of claim 10, wherein exhaust air from the preliminary drying zone flows as drying air along the slabs in the enclosed area counter to a conveying direction of the slabs.

13. The method of claim 10, wherein the drying air from the enclosed area is fed to a chimney via a pipe.

14. The method of claim 13, wherein the drying air is withdrawn from the enclosed area by a fan inserted in the pipe.

15. The method of claim 10, wherein a supply of drying air into the enclosed area is controlled or regulated by temperature and/or humidity sensors.

16. The method of claim 10, wherein the negative pressure of (i) is 25 Pa or less.

17. The method of claim 10, wherein the moisture content of (ii) is 20 g or less per kilogram of air.

* * * * *